United States Patent
Eason et al.

(10) Patent No.: US 8,301,488 B2
(45) Date of Patent: Oct. 30, 2012

(54) DETERMINATION OF DECISION SUPPORT DATA CONCERNING CUSTOMER SATISFACTION IMPROVEMENT TECHNIQUES

(75) Inventors: Ryan Nicholas Eason, San Francisco, CA (US); Rong Zhou, Mountain View, CA (US); Anil Swami, Houston, TX (US)

(73) Assignee: Accenture Global Services Limited, Dublin (IE)

( * ) Notice: Subject to any disclaimer, the term of this patent is extended or adjusted under 35 U.S.C. 154(b) by 574 days.

(21) Appl. No.: 12/542,791

(22) Filed: Aug. 18, 2009

(65) Prior Publication Data
US 2011/0047003 A1 Feb. 24, 2011

(51) Int. Cl.
*G06Q 10/00* (2012.01)
(52) U.S. Cl. ............ 705/7.37; 705/7.31; 705/7.38; 705/7.41; 705/14.42; 705/14.43
(58) Field of Classification Search ........ 705/7.11–7.42; 709/201–244; 345/1.1–111
See application file for complete search history.

(56) References Cited

U.S. PATENT DOCUMENTS

| | | |
|---|---|---|
| 5,734,890 A | 3/1998 | Case et al. |
| 7,340,409 B1 | 3/2008 | Ulwick |
| 7,707,062 B2 * | 4/2010 | Abramowicz ............... 705/7.31 |
| 7,725,345 B2 * | 5/2010 | Furin et al. .................. 705/7.32 |
| 2002/0184082 A1 * | 12/2002 | Nakano et al. .................. 705/10 |
| 2007/0038501 A1 * | 2/2007 | Lee et al. ......................... 705/10 |
| 2007/0192163 A1 * | 8/2007 | Barr ................................ 705/10 |
| 2009/0192878 A1 | 7/2009 | Lefang et al. |
| 2009/0240562 A1 * | 9/2009 | Kohno et al. .................. 705/10 |
| 2009/0319339 A1 * | 12/2009 | Singh ............................. 705/10 |

OTHER PUBLICATIONS

Examiner's First Report issued in Australian Application No. 2010212393 on Feb. 7, 2011.

* cited by examiner

*Primary Examiner* — David Rines
(74) *Attorney, Agent, or Firm* — Vedder Price PC (57) ABSTRACT

In relation to an entity such as a business having customers, a determination is made of at least one incremental satisfaction improvement value associated with increasing customer satisfaction of at least one customer by a fixed increment relative to a satisfaction scale. Based on the at least one incremental satisfaction improvement value, decision support data corresponding to a plurality of customer satisfaction improvement techniques is then determined, which decision support data may be presented in any desirable manner such as on a display device.

12 Claims, 4 Drawing Sheets

| 602 | Score | Weight | Benefits Impact | Detriments Impact | Satisfaction Value |
|---|---|---|---|---|---|
| Dissatisfied | 1 | $w_1$ | $B_1$ | $D_1$ | $S_1$ |
| | 2 | $w_2$ | $B_2$ | $D_2$ | $S_2$ |
| | · | · | · | · | · |
| | · | · | · | · | · |
| | · | · | · | · | · |
| | 9 | $w_9$ | $B_9$ | $D_9$ | $S_9$ |
| Satisfied | 10 | $w_{10}$ | $B_{10}$ | $D_{10}$ | $S_{10}$ |

| | Score | Weight | Benefits Impact | Detriments Impact | Satisfaction Value |
|---|---|---|---|---|---|
| Dissatisfied | 1 | $w_1$ | $B_1$ | $D_1$ | $S_1$ |
| | 2 | $w_2$ | $B_2$ | $D_2$ | $S_2$ |
| | . | . | . | . | . |
| | . | . | . | . | . |
| | . | . | . | . | . |
| | 9 | $w_9$ | $B_9$ | $D_9$ | $S_9$ |
| Satisfied | 10 | $w_{10}$ | $B_{10}$ | $D_{10}$ | $S_{10}$ |

|  |  | POINT CONTRIBUTION | | | |
| --- | --- | --- | --- | --- | --- |
| TECHNIQUE | COST | BUSINESS 1 | BUSINESS 2 | TOTAL | VALUE |
| TECHNIQUE 1 | 1 | 18.3 | 0.8 | 21.1 | $747,354 |
| TECHNIQUE 2 | 2 | 5.8 | 4.3 | 10.1 | $266,079 |
| ⋮ | ⋮ | ⋮ | ⋮ | ⋮ | ⋮ |
| TECHNIQUE 13 | 1 | 2.8 | 0.7 | 3.5 | $118,519 |
| TECHNIQUE 14 | 3 | 22.1 | 2.1 | 24.2 | $910,728 |
| POINT TOTALS | | 120.0 | 33.3 | | $5,103,213 |
| VALUE TOTALS | | $4,862,807 | $240,406 | | |
| INCREMENTAL CSAT VALUE (INCREMENT = 100 POINTS) | | $4,052,339 | $721,939 | | |

DETERMINATION OF DECISION SUPPORT DATA CONCERNING CUSTOMER SATISFACTION IMPROVEMENT TECHNIQUES

FIELD OF THE INVENTION

The instant disclosure relates generally to improvement of customer satisfaction and, in particular, to the evaluation of the effectiveness of techniques employed to improve customer satisfaction and the subsequent determination of decision support data related to such customer satisfaction improvement techniques.

BACKGROUND OF THE INVENTION

The success of virtually any business (regardless of the size, products, services, etc. of that business) turns in large part on the satisfaction of the business's customers. A business with highly satisfied customers is much more likely to stay in business and provide high value levels to its owners than a business that has poorly satisfied or dissatisfied customers. Understanding this, many businesses employ a wide variety of techniques, often dependent upon the nature of the business, to improve customer satisfaction. For example, a consumer products company may be most effective at enhancing customer satisfaction through the provision of effective repair/replacement programs, an enhanced website that provides customers easy access to frequently requested information, improved communications concerning product updates, etc. In contrast, a service provider may see improved customer satisfaction through improved communications concerning the nature of the services offered, an increased number of service offerings, more flexible payment options, etc.

Given the importance of constantly improving customer satisfaction, as well as the wide variety of techniques that may be used for this purpose, many businesses invest substantial resources carrying out customer satisfaction initiatives. Despite this, decisions concerning the implementation of customer satisfaction programs are often decided on the basis of instinct and intuition rather than knowledge and reason. As a result, it is often difficult to determine the effectiveness of customer satisfaction improvement efforts, e.g., which programs provide the most return for the investment of resources. In particular, it is often difficult to attach a specific value to such efforts, thereby improving the likelihood of inefficient resource allocations.

Thus, it would be advantageous to provide tools that assist in the objective determination of the effectiveness of various customer satisfaction improvement techniques, thereby providing decision guidance that should lead to improved, if not optimum, results.

SUMMARY OF THE INVENTION

The instant disclosure describes various embodiments of solutions for determining the effectiveness of customer satisfaction improvement techniques. In so doing, the instant disclosure provides for the efficient presentation of information that has traditionally been subjective in nature, i.e., the "real-world" value of efforts to improve customer satisfaction. To this end, a determination is made of at least one incremental satisfaction improvement value associated with increasing customer satisfaction of at least one customer (as assessed, for example, by customer satisfaction survey results) by a fixed increment relative to a satisfaction scale. The at least one incremental satisfaction improvement value may be expressed in monetary terms or on any suitable basis. For example, an incremental satisfaction improvement value may comprise a value in dollars (or some other currency) of improving customer satisfaction of one or more customers by a single point on a 10-point scale. Based on the at least one incremental satisfaction improvement value, decision support data corresponding to a plurality of customer satisfaction improvement techniques is then determined, which decision support data may be presented in any desirable manner such as on a display device.

In an embodiment, the at least one incremental satisfaction improvement value is calculated based on increased benefit value and/or decreased detriment value as assessed across categories of customer satisfaction. More particularly, the increased benefit value and/or decreased detriment value may be assessed according to changes therein (difference values) associated with incrementally moving customers up a satisfaction scale and combining the resulting difference values (e.g., through weighted summation) to provide the at least one incremental satisfaction improvement value. In an embodiment, the difference values are weighted according to the relative size of a corresponding category of customer satisfaction.

In another embodiment, each of the various customer satisfaction improvement techniques have associated therewith a plurality of attributes. Thus, the various techniques may be evaluated by determining the contribution of each such attribute to the incremental satisfaction improvement value. Thereafter, for each technique, the resulting attribute contributions can be assessed to determine technique values that are subsequently provided as the decision support data.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
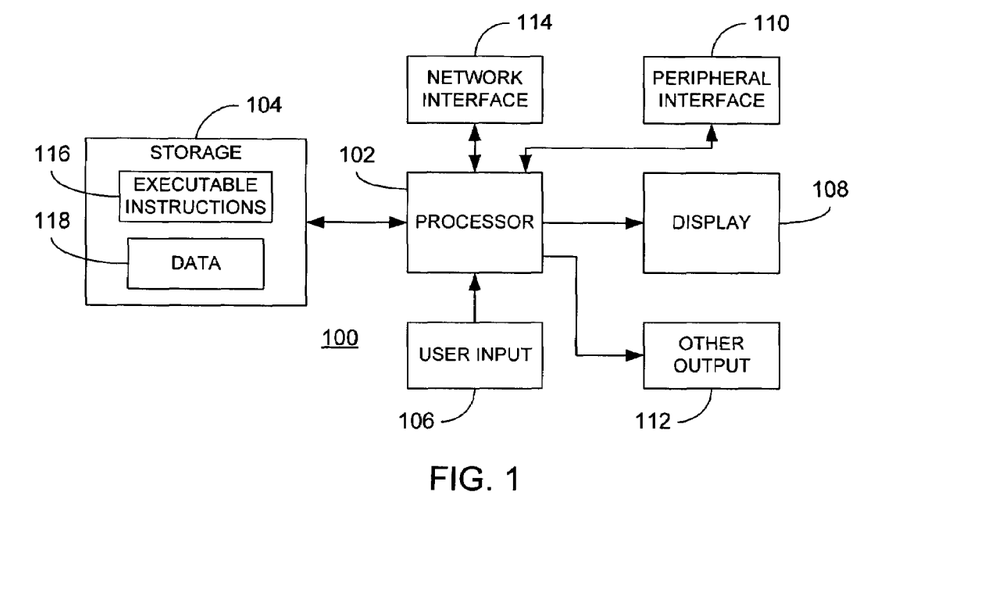
FIG. 1 is a block diagram of a computer system that may be used to implement the various embodiments described in the instant disclosure.

FIG. 1 illustrates a representative processing device 100 that may be used to implement the teachings of the instant disclosure. The device 100 may be used to implement, for example, one or more components of the devices illustrated in FIGS. 3-5, as described in greater detail below. Regardless, the device 100 comprises a processor 102 coupled to a storage component 104. The storage component 104, in turn, comprises stored executable instructions 116 and operational data 118 (i.e., data that is operated upon by components implemented by the stored executable instructions 116). In an embodiment, the processor 102 may comprise one or more processing devices such as a microprocessor, microcontroller, digital signal processor, or combinations thereof capable of executing the stored instructions 116 and operating upon the stored data 118. Likewise, the storage component 104 may comprise one or more memory devices such as volatile or nonvolatile memory including but not limited to random access memory (RAM) or read only memory (ROM). Processor and storage arrangements of the types illustrated in FIG. 1 are well known to those having ordinary skill in the art. In one embodiment, the processing techniques described herein are implemented as a combination of executable instructions and data within the storage component 104.

As shown, the device 100 may comprise one or more user input devices 106, a display 108, a peripheral interface 110, other output devices 112 and a network interface 114 in communication with the processor 102. The user input device 106 may comprise any mechanism for providing user input (such as inputs specifying query topics, entity types, etc. as described below) to the processor 102. For example, the user input device 106 may comprise a keyboard, a mouse, a touch screen, microphone and suitable voice recognition application or any other means whereby a user of the device 100 may provide input data to the processor 102. The display 108, may comprise any conventional display mechanism such as a cathode ray tube (CRT), flat panel display, or any other display mechanism known to those having ordinary skill in the art. The peripheral interface 110 may include the hardware, firmware and/or software necessary for communication with various peripheral devices, such as media drives (e.g., magnetic disk or optical disk drives), other processing devices or any other input source used in connection with the various embodiments described herein. Likewise, the other output device(s) 112 may optionally comprise similar media drive mechanisms, other processing devices or other output destinations capable of providing information to a user of the device 100, such as speakers, LEDs, tactile outputs, etc. Finally, the network interface 114 may comprise hardware, firmware and/or software that allows the processor 102 to communicate with other devices via wired or wireless networks, whether local or wide area, private or public, as known in the art. For example, such networks may include the World Wide Web or Internet, or private enterprise networks, as known in the art.

While the device 100 has been described as one form for implementing the techniques described herein, those having ordinary skill in the art will appreciate that other, functionally equivalent techniques may be employed. For example, as known in the art, some or all of the executable instruction implemented functionality may be implemented using firmware and/or hardware devices such as application specific integrated circuits (ASICs), programmable logic arrays, state machines, etc. Further still, other implementations of the device 100 may include a greater or lesser number of components than those illustrated. Once again, those of ordinary skill in the art will appreciate the wide number of variations that may be used is this manner.

Figure 2:
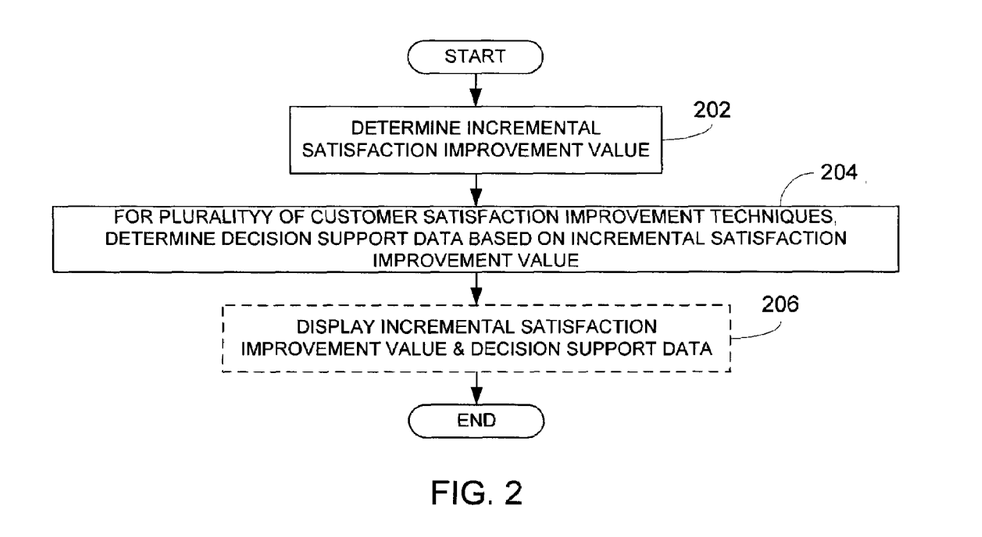
FIG. 2 is a flowchart of a processing in accordance with an embodiment described herein.

Referring now to FIG. 2, processing in accordance with the instant disclosure is illustrated. As noted above, the processing illustrated in FIG. 2 is preferably implemented by one or more processors executing instructions on a suitable storage or memory device, as in the case of the processing device implementation illustrated in FIG. 1, although it is understood that this is not a requirement. Further still, the embodiments illustrated in FIGS. 3-5 may be also be used for this purpose, potentially in conjunction with the processing device implementation illustrated in FIG. 1. Regardless, processing begins at block 202 where at least one incremental satisfaction improvement value (ISIV) is determined. As used herein, an ISIV is an expression of the potential realizable value to the entity (business) in question when they are able to increase customer satisfaction for one or more customers by a fixed increment on a satisfaction scale. Furthermore, although a single ISIV could be used to cover all activities of the entity, it may be desirable to determine separate ISIVs according to any convenient and meaningful boundaries relevant to the entity. For example, for a company operating in various regions around the country, it may be desirable to determine separate ISIVs for each different region or, for a company offering related by highly distinguishable product or service lines, it may be desirable to determine separate ISIVs according to the separate product/service lines. Further still, such distinguishing factors could be combined as desired, e.g., an ISIV for a given product line in a given region. Such further embodiment in this vein will be readily apparent to those having ordinary skill in the art.

Figure 6:
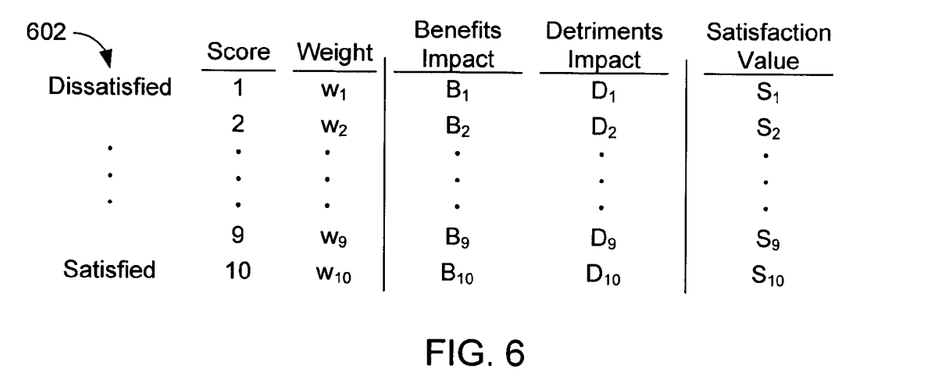
FIG. 6 is a chart illustrating the use of benefit and detriment data in the determination of incremental satisfaction improvement value in accordance with an embodiment described herein.

As known in the art, a satisfaction scale in accordance with the instant disclosure may comprise a numeric scale where the lowest number corresponds to lowest levels of customer satisfaction (i.e., most dissatisfied customers) and the highest number corresponds to highest levels of customer satisfaction with intermediate satisfaction levels expressed according to fixed increments, e.g., a scale from 1 to 10 with increments of 1, 0 to 100 with increments of 10, etc. An example of this is illustrated in FIG. 6 where a scale 602 from 1 (dissatisfied) to 10 (satisfied) with 1 point increments is employed. Such scales are often used in customer satisfaction surveys as known in the art, and may be used to gauge overall customer satisfaction or within specific areas relevant to customers. For example, in addition to using a numeric scale to ask about overall customer satisfaction, the same scale can be used when inquiring about specific aspects of a customer's experience with an entity, e.g., customer service, price competitiveness, delivery time, employee courtesy, etc. For purposes of the instant disclosure, it is assumed that customer satisfaction data according to the selected satisfaction scale is obtained using any conventional means.

As noted above, the at least one ISIV may be expressed according to any useful metric of value. For example, in one embodiment, such value is expressed as units of currency (e.g., US$, €, etc.). Further still, in an embodiment, the ISIV is expressed as units of currency gained for each single-increment increase in customer satisfaction for one or more customers (it being generally anticipated that increases in customer satisfaction lead to value gains, rather than losses, for the entity). However, it is understood that other expressions of value could be equally employed for this purpose. For example, value could be expressed as units of currency gained for multiple-increment increases of one or more customers, as market share gained, man-hours saved, etc. Stated generally, and as described in greater detail below, value may be expressed according to any convenient metric showing an increase in some benefit to the entity, a decrease in some detriment to the entity or any combination of both.

Regardless of the particular representation of the ISIV, processing continues at block 204 where decision support data for a plurality of customer satisfaction improvement techniques is determined based on the at least one ISIV determined at block 202. As used herein, a customer satisfaction improvement technique (or treatment) may comprise any activity that may be used by an entity to improve customer satisfaction. Furthermore, and as described in greater detail below, it is desirable that the customer satisfaction improvement techniques considered are capable of being analyzed according to various customer satisfaction drivers and their underlying attributes. Regardless, given the large variety of offerings available to customers of all types in any of a number of field of endeavor, the nature of relevant customer satisfaction techniques for any given entity will necessarily be highly dependent on the nature of the offerings of that entity. For example, for a healthcare provider such as a hospital, techniques targeted to provide quick service delivery or to accurate billing information to customers would be highly relevant, whereas for a consumer product company, attractive rebate programs or more generous warranty policies may be most relevant. In this regard, the instant disclosure is not limited by the particulars of the customer satisfaction improvement techniques considered.

Decision support data may comprise any useful metric that assists in the determination of which customer satisfaction improvement techniques are most effective and, consequently, that assists in decisions concerning how to best deploy resources for implementing customer satisfaction improvement techniques. Stated another way, the decision support data is a more concrete, actionable representation (in terms of value) of the instinctual and intuitive insight that often pervades prior art techniques, thereby rendering them less predictable. In an embodiment, the decision support data is determined by mapping the potential value represented by the at least one ISIV to individual customer satisfaction improvement techniques, thereby permitting ordering or ranking of the customer satisfaction improvement techniques according to their potential to increase value provided to the entity. For example, in an embodiment described in further detail below, the attributes underlying the various drivers of customer satisfaction are assigned values based on the at least one ISIV. Thereafter, the individual contributions of the per attribute values determined in this manner are summed across each customer satisfaction improvement technique to determine the potential value of each technique.

Regardless of the manner in which it determined, the decision support data may be expressed in any convenient format, such as textually or numerically represented units of value (as noted above) for each of the plurality of customer satisfaction improvement techniques being considered. As illustrated by block 206, the decision support data and/or the one or more ISIVs may be displayed to a user. As used herein, such display may employ any conventional channel for providing outputs to a user, e.g., a computer display, a print out, an email message, etc. Furthermore, various values within the decision support data may be compared to one or more static scales or relative to one each other, examples of which are further illustrated below. In this manner, the effectiveness of customer satisfaction improvement techniques can be visualized in ways previously not available.

Figure 3:
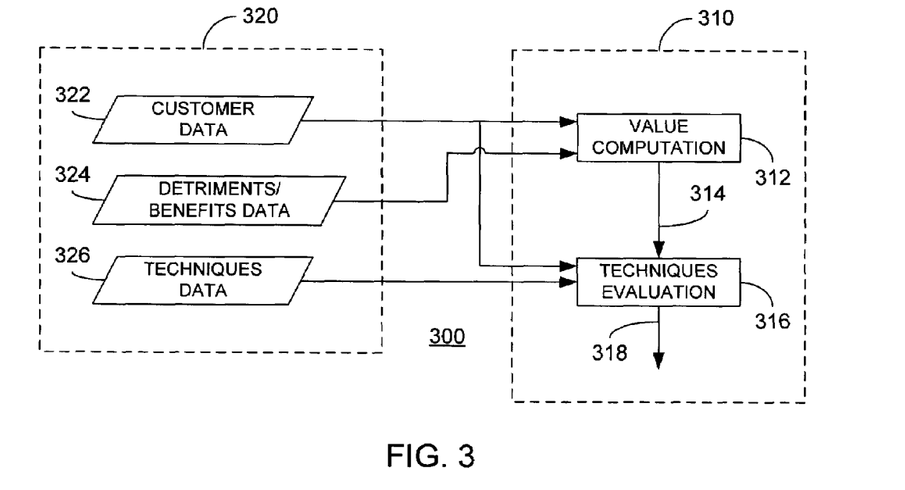
FIG. 3 is a block diagram of an apparatus for determining decision support data related to customer satisfaction improvement techniques in accordance with an embodiment described herein.

Referring now to FIG. 3, a system 300 or determining decision support data related to customer satisfaction improvement techniques in accordance with the instant disclosure. In an embodiment, the system 300 is implemented as stored instructions executed by one or more processors and operating upon stored operation data, as in the embodiment illustrated above relative to FIG. 1. This is illustrated in FIG. 3 where operational data 320 is provided to components 310 implemented as stored instructions executed by one or more processors. However, it is understood, as noted above, that the functions performed by the components 310 may be equally implemented in various hardware embodiments.

As shown, the components 310 comprise a value computation component 312 and a techniques evaluation component 314. In particular, the value computation component 312 takes as input customer data 322 and detriments/benefits data 324 and, using the processing described herein, provides one or more incremental satisfaction improvement values 314 as output. In turn, the techniques evaluation component 316 takes as input the one or more ISIVs 314, techniques data 326 and, optionally, customer data 322 and, using the processing described herein, provides decision support data 318 as output. The customer support data 322 comprises data all data concerning customers of the entity such as customer statistics and demographics, customer satisfaction survey results, etc. represented in any convenient format. The detriments/benefits data 324 comprises all data concerning detriments (which may be beneficially decreased in accordance with improved customer satisfaction) and benefits (which may be beneficially increased in accordance with improved customer satisfaction) relevant to the entity and impacted in some manner by varying levels of customer satisfaction, specific examples of which are described below. In an embodiment, the detriments/benefits data 324 is expressed in the same units of value used to compute the ISIV(s) 314, e.g., units of currency. The techniques data 326 comprises a listing of the various customer satisfaction improvement techniques as well as a breakdown of the drivers and attributes as noted above.

Figure 4:
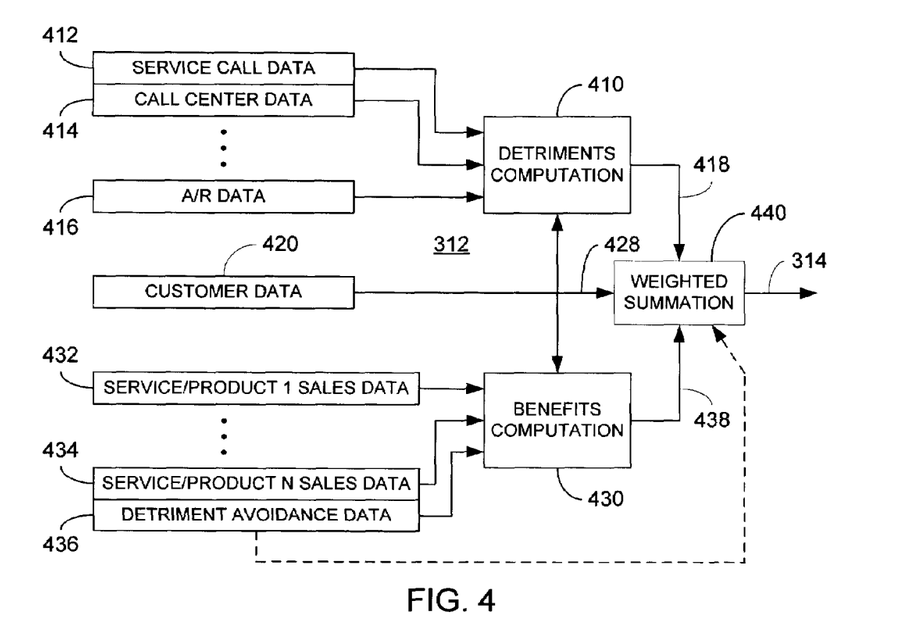
FIG. 4 is a block diagram illustrating a value computation component of FIG. 3 in greater detail.

A more detailed view of the value computation component 312 is illustrated in FIG. 4. As shown, the value computation component 312 comprises a detriments computation component 410 and a benefits computation component 430 operatively connected to a weighted summation computation component 440. As noted above, although both the detriments computation component 410 and the benefits computation component 430 are shown, it is understood that the determination of the one or more ISIVs may be based on detriments alone or benefits alone as desired. The detriments computation component 410 takes as input various detriment data 412-416 (taken from the detriments/benefits data 324) and apportions it according to groups of one or more customers corresponding to various ones of a plurality of customer satisfaction levels. To this end, the customer data 420 (taken from the customer data 322 illustrated in FIG. 3) comprises data concerning which customers fall into the various customer satisfaction levels, thereby allowing the detriments data 412-416 to be correlated to specific customer satisfaction levels. In the representative example illustrated in FIG. 4, the detriment data may comprise data regarding the costs 412 associated with performing service calls, the costs 414 associated with handling calls from customers via a call center and the amounts 416 of accounts receivable. In each of these instances, the underlying assumption is that detriments are likely to be higher for customers having the lowest levels of customer satisfaction, whereas customers with the highest levels of customer satisfaction are more likely to contribute the least to detriments.

As a simplified example, and assuming a customer satisfaction scale from 1 (lowest) to 3 (highest) in single point increments, the call center data 414 may indicate that US$1,000,000 was spent in the last year implementing call center operations. Furthermore, the customer data 420 may indicate that of the total call volume handled by the call center during the last year, 60% of the calls were from customers falling within the lowest customer satisfaction category (e.g., customer satisfaction ranking=1), whereas 30% of the calls were from customers falling within the middle customer satisfaction category (e.g., customer satisfaction rating=2) and 10% of the calls were from customers falling within the highest customer satisfaction category (e.g., customer satisfaction rating=3). Based on this, the detriments computation component 410 would apportion US$600,000 of the call center detriment (i.e., the annual operating cost of the call center) to the lowest satisfaction category, US$300,000 would be apportioned to the middle satisfaction category and US$1,000,000 would be apportioned to the highest satisfaction category. Similar examples of attributing the other detriments 414, 416 to the various customer satisfaction levels will be apparent. The resulting apportioned detriments 418 are then provided to the weighted summation component 440 for further processing.

In a similar vein, the benefits computation component 410 takes as input various benefit data 432-436 (also taken from the detriments/benefits data 324) and apportions it according to the groups of one or more customers corresponding to the various customer satisfaction levels. As before, the customer data 420 comprises data concerning which customers fall into the various customer satisfaction levels, thereby allowing the detriments data 432-436 to be correlated to specific customer satisfaction levels. In the representative example illustrated in FIG. 4, the benefit data may comprise data regarding the overall sales revenue in US$ 432, 434 for various services or products. Special categories of detriments (particularly those that are not readily predictable such as regulatory penalties, adverse lawsuit judgments, etc. and that are capable of being attributed, at least in part, to customer satisfaction) may be consider as part of benefits data to the extent that they may be avoided 436. In each of these instances, the underlying assumption is that benefits are likely to be reduced for customers having the lowest levels of customer satisfaction, whereas customers with the highest levels of customer satisfaction are more likely to contribute the most to such benefits.

Referring again to the simplified example noted above, the sales data 432 for a first product or service may indicate that US$25,000,000 in revenue was generated in the last year for this product/service. Furthermore, the customer data 420 may indicate that of the total sales of this product/service during the last year, 5% of the sales were from customers falling within the lowest customer satisfaction category, whereas 40% of the sales were from customers falling within the middle customer satisfaction category and 55% of the sales were from customers falling within the highest customer satisfaction category. Based on this, the benefits computation component 430 would apportion US$1,250,000 of the product/service benefit (i.e., the annual sales revenue) to the lowest satisfaction category, US$10,000,000 would be apportioned to the middle satisfaction category and US$13,750,000 would be apportioned to the highest satisfaction category. Similar examples of attributing the other benefits 434, 436 to the various customer satisfaction levels will be apparent. The resulting apportioned benefits 438 are then provided to the weighted summation component 440 for further processing.

An example of this is illustrated in FIG. 6. According to a satisfaction scale 602, in this case comprising 10 different customer satisfaction levels having corresponding scores of 1 through 10, each customer satisfaction level, i, has (for ease of illustration) a single apportioned benefit, $B_i$, and a single apportioned detriment, $D_i$. In this case, a satisfaction value, $S_i$, for each customer satisfaction level is determined by simply summing the corresponding apportioned benefit and detriment. Thereafter, as described below, ISIVs 314 may be calculated based on weighted differences (using the illustrated weights, $w_i$) between successive satisfaction levels.

In a typical implementation, however, there will often be multiple detriments and benefits and, in this case, the weighted summation component 440 computes the ISIVs 314 based on the various apportioned detriments 418 and the apportioned benefits 438. To begin, for each customer satisfaction level, i, the apportioned detriments, $D_j$, and the apportioned benefits, $B_k$, are summed to provide a corresponding satisfaction value, $S_i$:

$$S_i = \sum_j \sum_k D_{ij} + B_{ik} \quad \text{Equation 1}$$

In words, for each satisfaction level, the satisfaction value is the sum of the various detriments and benefits apportioned to that satisfaction level. Thus, for $1 \leq i \leq 10$, for example, there would be ten different satisfaction values. Having calculated the satisfaction values in this manner, the weighted average component 440 then computes the ISIVs 314 according to:

$$ISIV_{i,i+1} = \sum_i (S_{i+1} - S_i) * w_i \quad \text{Equation 2}$$

Where: $i, i+1 \leq N$ for N=the maximum number of satisfaction levels, e.g., 10 in the previous example. In other words, the ISIV 314 is a plurality of difference values between successive pairs of satisfaction values that are weighted and summed together. Note that the weights employed in Equation 2 and illustrated in FIG. 6 may be chosen to reflect the relative importance of each customer satisfaction level. In an embodiment, the weights are chosen according to the size of each customer satisfaction level, e.g., the number of customers grouped into each customer satisfaction level or the percentage of such number of customers in each customer satisfaction level relative to the overall number of customers. Weighted in this fashion, then, the ISIV 314 represents a weighted average value to the entity, in terms of potential detriments avoided or benefits gained, in raising overall customer satisfaction a single increment.

While ISIV may be calculated in the manner described above, those having ordinary skill in the art will appreciate that other techniques for transforming potential benefits gained and detriments avoided into a suitable representation of ISIV may be equally employed. For example, rather than calculating differences between successive satisfaction values, larger incremental steps may be employed, e.g., increments of two satisfaction points ($S_i+2 - S_i$). Further still, the weights may be chosen not by the relative size of each customer satisfaction level, but by the importance of moving customers of given customer satisfaction level up the satisfaction scale. For example, and again assuming a 10-point satisfaction scale, an entity may be more concerned with moving customers in the lowest satisfaction level up a single level than moving customers in the second-highest satisfaction level up to the highest satisfaction level. In this case, the weights employed would more heavily weight customers in the lowest satisfaction level relative to the highest satisfaction level, regardless of the numbers of customers in each level. Again, the ISIV may be determined in—any manner that is relevant (e.g., average increase, low-end increases, high-end increases, etc.) to the entity's goals for improving customer satisfaction. Furthermore, although the description above concerned calculation of a single ISIV, as noted above, it may be desirable to determine multiple, separate ISIVs according to any convenient and meaningful boundaries (separate businesses, product or service lines, etc.) within an entity.

Figure 5:
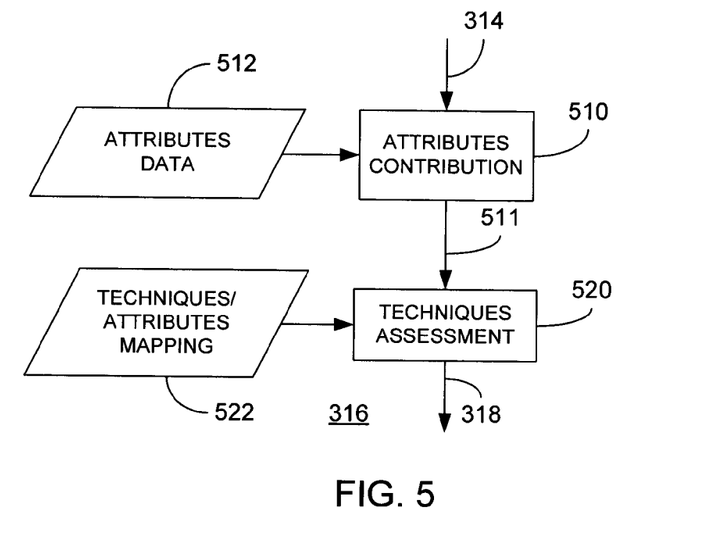
FIG. 5 is a block diagram illustrating a techniques evaluation component of FIG. 3 in greater detail.

A more detailed view of the techniques evaluation component 316 is illustrated in FIG. 5. In particular, an attributes computation component 510 takes as input the one or more ISIVs 314 provided by the value computation component 312 as well as attributes data 512 (taken from the customer data 322) and provides attribute contributions to the techniques assessment component 520. In turn, the techniques assessment component 318 determines for each customer satisfaction technique and according to an attribute mapping for each customer satisfaction technique 522, a technique value, with the resulting technique values for each customer satisfaction technique being subsequently provide as the decision support data 318.

Figure 7:
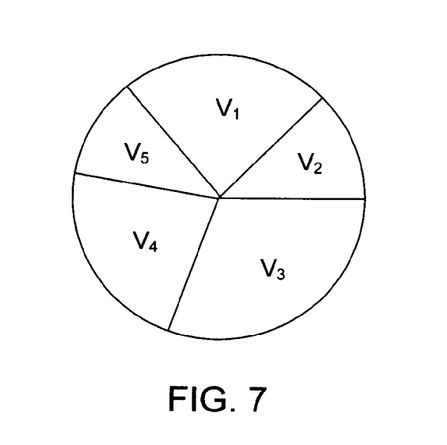
FIG. 7 is graph illustrating relative contributions of attributes to a driver of customer satisfaction in accordance with an embodiment described herein.

As noted above, the customer satisfaction survey data may include survey data (available from market and customer satisfaction research firms such as J.D. Power & Associates) concerning what are the most important factors, or drivers, concerning customer satisfaction. An example of this is illustrated in FIG. 7. In particular, FIG. 7 illustrates a breakdown by percentage of the overall importance of five different drivers of customer satisfaction, labeled $V_1$-$V_5$. For example, in a given industry, these five drivers may comprise "price" weighted at 25%, "quality" weighted at 20%, "service" weighted at 15%, "billing" weighted at 30% and "image" weighted at 10%. In turn, each driver may be characterized according to various attributes. For example, both the "image" driver may be characterized to varying degrees (i.e., weighted) in the minds of the survey customers by the attribute of "being perceived as honest and ethical" and "is concerned about the environment". Alternatively, the "price" driver may be heavily influenced by the "fairness in pricing" attribute and less so by the "availability of pricing options" attribute. By identifying a plurality of attributes, a many to many mapping between the attributes and the drivers may be created to characterize each of the drivers. Furthermore, by understanding the importance of each attribute to (i.e., the weightings assigned by) the customers, the relative contributions of each attribute to various customer satisfaction improvement techniques may also be determined. Each customer satisfaction improvement technique may be characterized by the degree to which they have an effect on each given attribute, i.e., an attribute-technique mapping 522 may be created. For example, a customer satisfaction technique geared to providing customers more options for paying their bills will likely have an impact on the "fairness in pricing" attribute. By mapping a contribution of each attribute to given technique, it then becomes possible to determine a technique value for a given customer satisfaction improvement technique by summing up the attribute contributions of each attribute characterizing the given technique.

For example, using the driver percentages described above, assume an entity wants to improve its average customer satisfaction level by a one and a half points on a 10-point scale. As a simplification, further assuming that the "billing" driver (weighted at 30%) is characterized by a first attribute weighted 60% and a second attribute weighted 40%. In this case, then, the attributes contribution component 510 will determine that the contribution of the first attribute to the 1.5 point increase will be 0.27 points (1.5 points*0.30 driver weight*0.60 attribute weight), whereas the contribution of the second attribute to the 1.5 point increase will be 0.18 points (1.5 points*0.30 driver weight*0.40 attribute weight). By making similar determinations for all other drivers and their constituent attributes, similar point value contributions may be calculated for each attribute toward the desired 1.5 point increase on the satisfaction scale. Thereafter, based on each of these attribute contributions 511, the techniques assessment component 520 may determine a technique value in terms of points attributable to each technique may be determined by summing up the attribution contributions 511 corresponding to each technique.

Figure 8:
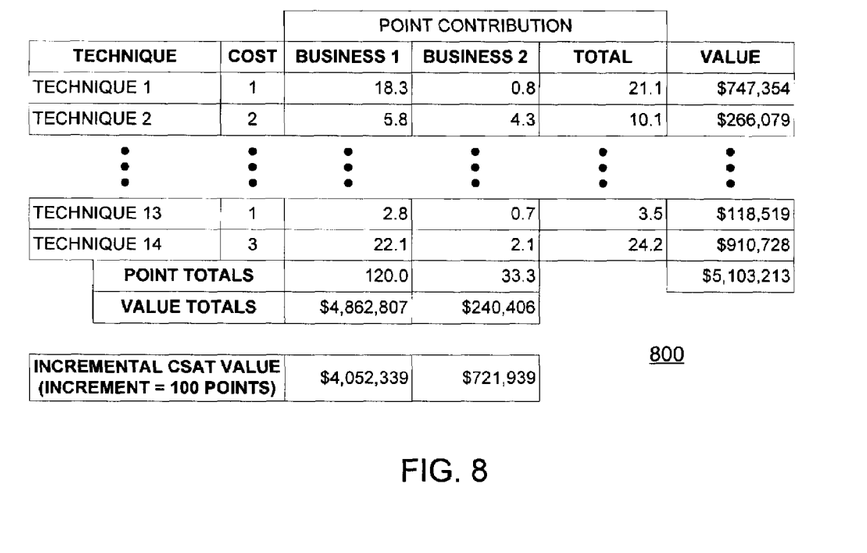
FIG. 8 is a representative example of a graphical user interface illustrating incremental satisfaction improvement values and attribute contributions corresponding to various customer satisfaction improvement techniques in accordance with an embodiment described herein.

A summarized example of this is illustrated in FIG. 8. In particular, for each of a plurality of customer satisfaction improvement techniques ("Technique 1", "Technique 2", etc.) a summarized technique value is provided for each of two separate businesses operated by an entity ("Business 1" and "Business 2"). For example, for "Technique 1", the sum of the attribute contributions for this technique under "Business 1" results in a technique contribution of 18.3 points (assuming, in this example, a W00-point satisfaction scale having 100-point increments). For "Business 1" the ISIV (again, on a 100-point increment) is shown to be US$4,052, 339 and for "Business 2" the ISIV is shown to be US$721, 939. Summing the technique contributions across the various businesses provides, in this example, an overall technique contribution. For example, with reference to "Technique I" the overall technique contribution is 21.1 points. Expressed in terms of the per point ISIV, this overall technique contribution is seen to have a value of $747,354 (18.3 points*[$4,052, 3391100 points])+0.8 points*[$721,9391100 points]). Similarly, for each business, the overall points and value contributions across all of the various techniques may be calculated. For example, for "Business 1" the point contribution from implementing all of the techniques is seen to be 120.0 points. Multiplying this by the normalized ISIV [$4,052,33911 00 points], an overall value contribution of US$4,862,807 is calculated. By displaying the data of FIG. 8 as a graphical user interface 800, a viewer thereof is provided with a fact-based visualization of the relative value of the various customer satisfaction improvement technique options (decision support data) as indicated by the resulting values (right-hand column).

Figure 9:
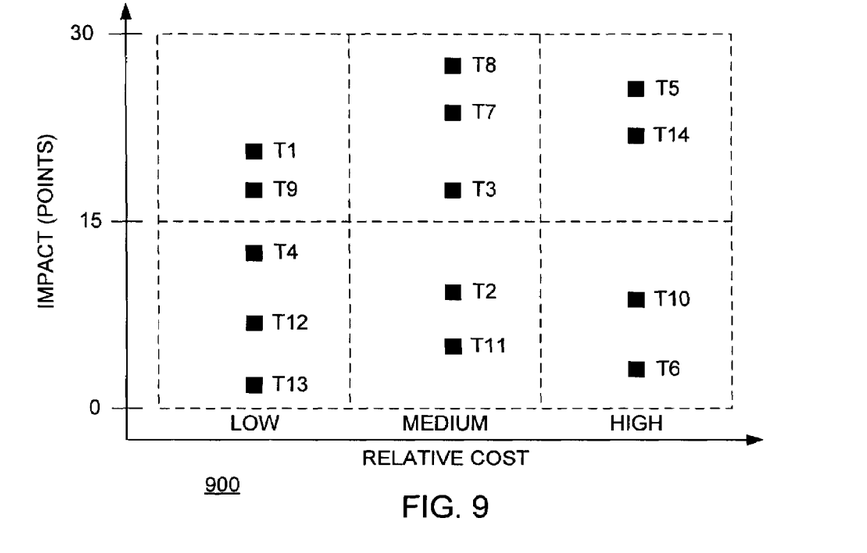
FIG. 9 is a graph illustrating relative ranking of the various customer satisfaction improvement techniques of FIG. 8 in accordance with an embodiment described herein.

In an alternate embodiment, the decision support data may be presented in a graphical format. An example of this, based on the data illustrated in FIG. 8, is further illustrated in FIG. 9. In particular, each customer satisfaction improvement technique illustrated in FIG. 8 includes a cost estimate for implementing that technique. In the illustrated example, each cost estimate is represented according to a low=1/medium=2/high=3 scale, although it is understood that any desirable cost scale may be employed for this purpose. Given this categorization, each technique is mapped according to its relative cost and impact on customer satisfaction improvement as represented by the technique values (in points) shown in FIG. 8. In particular, a graphical user interface 900 comprising a graph of each technique is shown. Thus, for example, a relatively low cost customer satisfaction improvement technique having a relatively high impact (such as "Technique 1", T1) is illustrated in the upper left portion of the graph. Such low cost, high impact techniques are attractive candidates for implementation in terms of best return on customer satisfaction improvement for the resources invested. Conversely, a relatively high cost customer satisfaction improvement technique having a relatively low impact (such as "Technique 6", T6) is illustrated in the lower right portion of the graph. Such high cost, low impact techniques are not attractive candidates for implementation as the return on the resources invested may not be justified by the high cost. Based on decision support data represented in this manner, a decision maker is greatly aided in determine how to most effectively invest relatively scarce resources in customer satisfaction improvement initiatives.

As described above, the instant disclosure describes various embodiments for the transformation and presentation of previously subjective information into an objective, and therefore more readily comprehensible and actionable, form through use of an automated system. More particularly, the objective data is provided in the form of decision support data concerning the effectiveness of various customer satisfaction improvement techniques. This is accomplished by first determining one or more incremental satisfaction improvement values and, based in part upon this data, further evaluation the various customer satisfaction improvement techniques under consideration. In addition to providing a better basis for making decisions concerning customer satisfaction improvement techniques, the embodiments described herein further enable goal setting and tracking to the extent that predictions based on anticipated value realization may be established.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A method for determining the effectiveness of a plurality of customer satisfaction improvement techniques, the method comprising:

determining, by a value computation component implemented using at least one processing device, at least one incremental satisfaction improvement value associated with increasing customer satisfaction of at least one customer by a fixed increment on a satisfaction scale based on at least one of increased benefit value and decreased detriment value by categories of customer satisfaction in accordance with detriments/benefits data and customer data, wherein determining the at least one incremental satisfaction improvement value comprises:

apportioning, by a detriments computation component implemented using the at least one processing device, at least some detriments from the detriments/benefits data according to groups of customers for a plurality of satisfaction levels per the customer data to provide a plurality of apportioned detriments;

apportioning, by a benefits computation component implemented using the at least one processing device, at least some benefits from the detriments/benefits data according to the groups of customers to provide a plurality of apportioned benefits;

for each of the plurality of satisfaction levels, calculating, by a weighted average component implemented using the at least one processing device and operatively connected to the detriments computation component and the benefits computation component, a satisfaction value based on a summation of corresponding ones of the plurality of apportioned detriments and the plurality of apportioned benefits to provide a plurality of satisfaction values;

for successive pairs of increasing satisfaction levels, calculating, by the weighted average component, a difference between ones of the plurality of satisfaction values to provide a plurality of difference values; and calculating, by the weighted average component, a weighted average of the plurality of difference values to provide the at least one incremental satisfaction improvement value; and determining, by a techniques evaluation component implemented using the at least one processing device and operatively coupled to the value computation component, decision support data corresponding to the plurality of customer satisfaction improvement techniques based at least in part upon the incremental satisfaction improvement value.

2. The method of claim 1, further comprising:

displaying, on a display operatively coupled to the value computation component and the techniques evaluation component, the at least one incremental satisfaction improvement value and the decision support data.

3. The method of claim 1, further comprising calculating the weighted average wherein weights for the weighted average are based on sizes of the groups of customer for the plurality of satisfaction values.

4. The method of claim 1, wherein determining the decision support data further comprises:

for each attribute of a plurality of attributes corresponding to the plurality of customer satisfaction improvement techniques, determining, by an attributes contribution component, an attribute contribution based on attribute data per the customer data and the at least one incremental satisfaction improvement value to provide a plurality of attribute contributions; and for each technique of the plurality of customer satisfaction improvement techniques, determining, by a techniques evaluation component operatively connected to the attributes contribution component, a technique value based on the techniques data and at least some of the plurality of attribute contributions corresponding to the technique to provide a plurality of technique values, wherein the decision support data comprises the plurality of technique values.

5. An apparatus for determining the effectiveness of a plurality of customer satisfaction improvement techniques, comprising:

at least one processing device implementing:

a value computation component that determines at least one incremental satisfaction improvement value associated with increasing customer satisfaction of at least one customer by a fixed increment on a satisfaction scale based upon at least one of increased benefit value and decreased detriment value by categories of customer satisfaction in accordance with detriments/benefits data and customer data, wherein the value computation component further comprises:

a detriments computation component that takes as input the detriments/benefits data and the customer data and, based thereon, apportions at least some detriments from the detriments/benefits data according to groups of customers for a plurality of satisfaction levels per the customer data to provide a plurality of apportioned detriments;

a benefits computation component that takes as input the detriments/benefits data and the customer data and, based thereon, apportions at least some benefits from the detriments/benefits data according to the groups of customers to provide a plurality of apportioned benefits; and a weighted average component operatively connected to the detriments computation component and the benefits computation component, that takes as input the plurality of apportioned detriments, the plurality of apportioned benefits and a plurality of weights corresponding to the plurality of satisfaction levels and, based thereon:

calculates, for each of the plurality of satisfaction levels, a satisfaction value based on a summation of corresponding ones of the plurality of apportioned detriments and the plurality of apportioned benefits to provide a plurality of satisfaction values;

calculates, for successive pairs of increasing satisfaction levels, a difference between corresponding ones of the plurality of satisfaction values to provide a plurality of difference values; and calculates a weighted average of the plurality of difference values based on the plurality of weights to provide the at least one incremental satisfaction improvement value; and a techniques evaluation component operatively connected to the valuation computation component, that takes as input the at least one incremental satisfaction improvement value and determines, based at least in part thereon, decision support data corresponding to the plurality of customer satisfaction improvement techniques.

6. The apparatus of claim 5, further comprising a display component, implemented using the at least one processing device, operatively connected to the valuation computation component and the techniques evaluation component, operative to display the at least one incremental satisfaction improvement value and the decision support data.

7. The apparatus of claim 5, wherein weights used by the weighted average component to calculate the weighted average are based on sizes of the groups of customer for the plurality of satisfaction values.

8. The apparatus of claim 7, wherein the techniques evaluation component further comprises:

an attributes contribution component, implemented using the at least one processing device, that takes as input the at least one incremental satisfaction improvement value and attribute data per the customer data and, based thereon, determines, for each attribute of a plurality of attributes corresponding to the plurality of customer satisfaction improvement techniques, an attribute contribution provide a plurality of attribute contributions; and a techniques evaluation component operatively connected to the attributes contribution component that takes as input the techniques data and the plurality of attribute contributions and, based thereon, determines, for each technique of the plurality of customer satisfaction improvement techniques, a technique value based on at least some of the plurality of attribute contributions corresponding to the technique to provide a plurality of technique values, wherein the decision support data comprises the plurality of technique values.

9. An apparatus for determining the effectiveness of a plurality of customer satisfaction improvement techniques, comprising:

at least one processor;
at least one storage device operatively connected to the at least one processor and having stored thereon instructions that, when executed by the at least one processor, cause the at least one processor to:

determine at least one incremental satisfaction improvement value associated with increasing customer satisfaction of at least one customer by a fixed increment on a satisfaction scale based on at least one of increased benefit value and decreased detriment value by categories of customer satisfaction in accordance with detriments/benefits data and customer data, wherein the instructions adapted to determine the at least one incremental satisfaction improvement value are further adapted, when executed by the at least one processor, to:

apportion at least some detriments from the detriments/benefits data according to groups of customers for a plurality of satisfaction levels per the customer data to provide a plurality of apportioned detriments;

apportion at least some benefits from the detriments/benefits data according to the groups of customers to provide a plurality of apportioned benefits;

for each of the plurality of satisfaction levels, calculate a satisfaction value based on a summation of corresponding ones of the plurality of apportioned detriments and the plurality of apportioned benefits to provide a plurality of satisfaction values;

for successive pairs of increasing satisfaction levels, calculate a difference between ones of the plurality of satisfaction values to provide a plurality of difference values; and calculate a weighted average of the plurality of difference values, wherein the weights for the weighted average are based on sizes of the groups of customer for the plurality of satisfaction values, to provide the at least one incremental satisfaction improvement value; and determining decision support data corresponding to the plurality of customer satisfaction improvement techniques based at least in part upon the incremental satisfaction improvement value.

10. The apparatus of claim 9, further comprising a display operatively connected to the at least one processor, wherein the at least one storage device further comprises instructions that, when executed by the at least one processor, cause the at least one processor to:

display, on the display, the at least one incremental satisfaction improvement value and the decision support data.

11. The apparatus of claim 9, wherein the instructions adapted to calculate the weighted average are further adapted to calculate the weighted average using weights based on sizes of the groups of customer for the plurality of satisfaction values.

12. The apparatus of claim 11, wherein the instructions adapted to determine the decision support data are further adapted, when executed by the at least one processor, to:

for each attribute of a plurality of attributes corresponding to the plurality of customer satisfaction improvement techniques, determine an attribute contribution based on attribute data per the customer data and the at least one incremental satisfaction improvement value to provide a plurality of attribute contributions; and for each technique of the plurality of customer satisfaction improvement techniques, determine a technique value based on the techniques data and at least some of the plurality of attribute contributions corresponding to the technique to provide a plurality of technique values, wherein the decision support data comprises the plurality of technique values.

* * * * *